US011113666B2

(12) United States Patent
Chung et al.

(10) Patent No.: US 11,113,666 B2
(45) Date of Patent: Sep. 7, 2021

(54) READER MODE FOR PRESENTATION SLIDES IN A CLOUD COLLABORATION PLATFORM

(71) Applicant: salesforce.com, inc., San Francisco, CA (US)

(72) Inventors: Andy Chung, Berkley, CA (US); Aaron Boodman, San Francisco, CA (US); Erik Arvidsson, San Francisco, CA (US); Kevin Gibbs, San Francisco, CA (US); Julie Tung, Los Altos, CA (US); Diane Berlin, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 422 days.

(21) Appl. No.: 16/264,041

(22) Filed: Jan. 31, 2019

(65) Prior Publication Data

US 2020/0090126 A1 Mar. 19, 2020

Related U.S. Application Data

(60) Provisional application No. 62/735,731, filed on Sep. 24, 2018, provisional application No. 62/735,746, (Continued)

(51) Int. Cl.
*G06Q 10/10* (2012.01)
*G06F 16/955* (2019.01)
(Continued)

(52) U.S. Cl.
CPC ......... *G06Q 10/101* (2013.01); *G06F 16/176* (2019.01); *G06F 16/9558* (2019.01); *G06F 40/169* (2020.01)

(58) Field of Classification Search
None
See application file for complete search history.

(56) References Cited

U.S. PATENT DOCUMENTS

2005/0289453 A1* 12/2005 Segal ................. G06F 1/12
715/203
2014/0047022 A1* 2/2014 Chan ................. H04L 12/1822
709/204

(Continued)

OTHER PUBLICATIONS

Extended European Search Report issued in European Application No. EP19197677.8, dated Dec. 17, 2019 (10 pages).

(Continued)

*Primary Examiner* — Dennis W Ruhl
(74) *Attorney, Agent, or Firm* — Sterne, Kessler, Goldstein & Fox P.L.L.C.

(57) ABSTRACT

Disclosed herein are system, method, and computer program product embodiments for improving user experiences within a cloud collaboration platform that integrates communication tools with word processor functions to enhance workflows, save time, and promote teamwork in the development of slide presentations. To improve usability, a cloud collaboration platform may furnish a reader mode to streamline the presentation review process. The reader mode may allow viewers to review the presentation as the presentation will eventually be presented to an audience. The viewers may provide comments and feedback on the presentation without being inundated with comments and metadata added to an edit mode of the presentation by the original authors.

20 Claims, 8 Drawing Sheets

Related U.S. Application Data filed on Sep. 24, 2018, provisional application No. 62/733,075, filed on Sep. 18, 2018.

(51) Int. Cl.
*G06F 16/176* (2019.01)
*G06F 40/169* (2020.01)

(56) References Cited

U.S. PATENT DOCUMENTS

2014/0053071 A1* 2/2014 Penner ............... G06Q 10/10
715/732
2015/0370772 A1* 12/2015 Wang ................. G06F 40/169
715/230

OTHER PUBLICATIONS

Reach, Catherine Sanders, "Google Drive Collaboration: It's a Document Party!", Attorney at Work, Mar. 18, 2019, available at: http://www.attorneyatwork.com/google-drive-collaboration-document-party-multiple-editors/ (5 pages).

Keeler, Alice, "Direct Comment to Someone in Google Docs—Teacher Tech", Apr. 22, 2016, available at: https://alicekeeler.com/2014/09/10/direct-comment-to-someone-in-google-docs/ (5 pages).

"Make Google Slides presentations interactive | Poll Everywhere", Nov. 5 2016, available at: https://www.polleverywhere.com/app/google-slides (4 pages).

* cited by examiner

READER MODE FOR PRESENTATION SLIDES IN A CLOUD COLLABORATION PLATFORM

CROSS-REFERENCE TO RELATED APPLICATIONS

This application claims the benefit of U.S. Provisional Patent Application 62/733,075, by Li, et al., "User Experience Improvements For The Development Of Presentation Slides In A Cloud Collaboration Platform," filed Sep. 18, 2018, U.S. Provisional Patent Application 62/735,746, by Chung, et al., "Reader Mode and Insights for Presentation Slides in a Cloud Collaboration Platform," filed Sep. 24, 2018, and U.S. Provisional Patent Application 62/735,731, by Chung, et al., "Slide Grid Snapping and Comment Anywhere For Presentation Slides In a Cloud Collaboration Platform," filed Sep. 24, 2018, which are hereby incorporated by reference in their entirety.

This application is related to U.S. patent application Ser. No. 16/263,860 titled "Slide Grid Snapping For Presentation Slides In A Cloud Collaboration Platform," filed herewith and U.S. patent application Ser. No. 16/263,851 titled "Insights Panel For Presentation Slides In A Cloud Collaboration Platform," filed herewith, both of which are herein incorporated by reference in their entireties.

BACKGROUND

A cloud collaboration platform may allow users to author various forms of content, for example, text files, spreadsheets, presentation slides, and other documents. The cloud collaboration platform may furnish a litany of word processing tools to facilitate document creation and revision. An author may also communicate with other users on the cloud collaboration platform, share documents, and receive comments, suggestions, edits, and other feedback. By integrating communication tools with word processor tools, a cloud collaboration platform may enhance workflows, save time, and promote teamwork.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art(s) to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
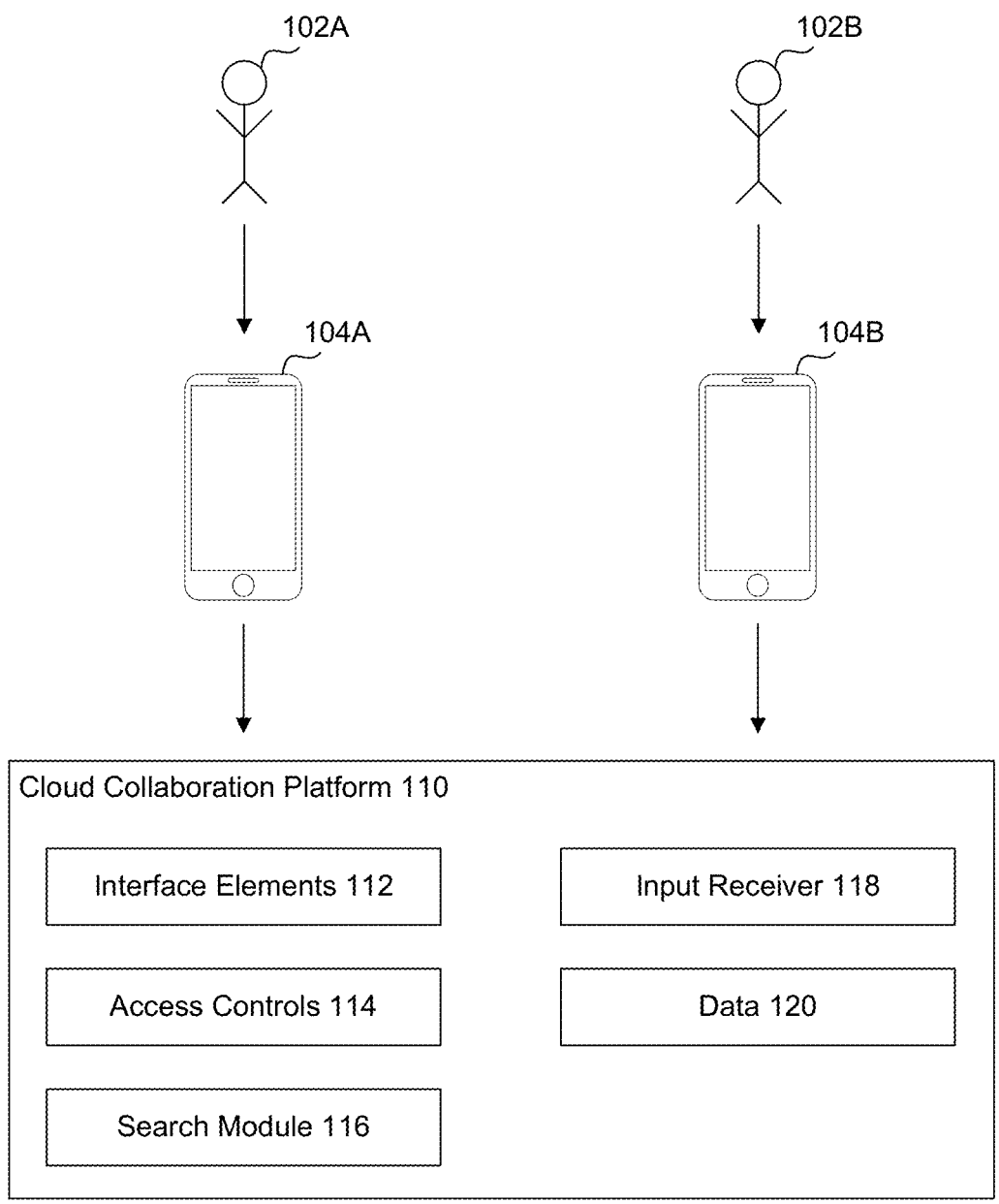
FIG. 1 is a schematic block diagram showing an example system including a cloud collaboration platform, according to some embodiments.

Provided herein are system, apparatus, device, method and/or computer program product embodiments, and/or combinations and sub-combinations thereof, for providing a reader mode within a cloud collaboration platform.

A cloud collaboration platform may allow multiple users to work together to design, write, implement, edit, and finalize various forms of content. Such content may be text files, spreadsheets, presentation slides, videos, audio files, or any other suitable documents. A cloud collaboration platform may include word processing and editing tools to create, compose, draft, and revise these files. A cloud collaboration platform may include a versioning system to dynamically track changes made to documents over time.

A cloud collaboration platform may encourage collaboration among users by allowing users to send other users messages, include comments in or on documents, post to message boards, solicit feedback, and engage in other suitable communications. Some comments in a cloud collaboration platform may be viewable by all users while other comments may be user-specific and only viewable by a subset of the users. Comments may tag, link, @mention, and/or reference other users, documents, and materials. Users may also post feedback stickers, i.e., prompts via which users can receive information from other users, conduct polls, receive text answers to questions, etc.

A cloud collaboration platform may incorporate various permissions and access controls. For example, a cloud collaboration platform may allow users to set access permissions to documents. In an embodiment, a document's author may control whether other users may edit or view the document, comment on the document, share the document, etc. An author may set access permissions on a per-user, i.e., grant access to only one user or a subset of users, and/or per-document basis, i.e., configure a different set of access permissions for each file in the cloud collaboration platform.

A cloud collaboration platform may allow users to create presentation slides. Users may collaborate to build content, edit, and finalize the slide presentation. By coupling word processing and communication tools together within the slide design process, users may save time that would otherwise be lost in meetings or wasted incorporating third-party communication and editing tools. For example, a user may add a new slide to a presentation and edit the slide directly in the cloud collaboration platform by adding images, text, video, sound, setting background colors, etc. A second author may edit the slide presentation further, add a second new slide, add comments to the slide presentation, raise questions, provide feedback, etc.

As authors collaborate in the creation of the presentation slides, the number of comments exchanged may grow quite large. Authors may further track changes and include various other types of metadata in the slide presentation, and this supporting information may also accumulate over time. At some point, the original authors may demo the presentation slides to a second set of users, outside of the original author group, to garner additional feedback to further polish the presentation or to deliver the finalize presentation to the intended audience (and receive feedback from the audience on the presentation). If all of the comments, edits, and other metadata from the original authors appear to the newly added users during the demonstration, the new users may not be able to view the presentation in an organic fashion, i.e., as the presentation would be received by an audience. Moreover, any comments added by the new users may be lost amidst the mass of comments and metadata that accumulated during the initial authoring phase.

Accordingly, a need exists to provide a reader mode within a cloud collaboration platform.

FIG. 1 is a schematic block diagram showing an example system 100 including a cloud collaboration platform, according to some embodiments. System 100 may include users 102, such as users 102A and 102B, devices 104, such as devices 104A and 104B, cloud collaboration platform 110.

Users 102 may be individuals or entities developing documents on a cloud collaboration platform. Users 102 may members of a business, organization, or other suitable group using the cloud collaboration platform to perform tasks related to that business or organization. Or users 102 may be individuals using a cloud collaboration platform for personal pursuits. Users 102 may be human beings, but users 102 may also be artificial intelligence constructs. Users 102 may employ, i.e., connect to, a network or combination of networks including the Internet, a local area network (LAN), a wide area network (WAN), a wireless network, a cellular network, or various other types of networks as would be appreciated by a person of ordinary skill in the art.

Devices 104 may be personal digital assistants, desktop workstations, laptops or notebook computers, netbooks, tablets, smart phones, mobile phones, smart watches or other wearables, appliances, part of the Internet-of-Things, and/or embedded systems, to name a few non-limiting examples, or any combination thereof. Although devices 104 are illustrated in the example of FIG. 1 as a single computer, one skilled in the art(s) will understand that devices 104 may represent two or more computers in communication with one another. Therefore, it will also be appreciated that any two or more components of system 100 may similarly be executed using some or all of the two or more computers in communication with one another.

Cloud collaboration platform 110 may combine word processing tools with communication tools to enhance teamwork and collaboration among multiple users in building, editing, and finalizing text files, documents, spreadsheets, presentation slides, and other files. Users may collaborate to build content, edit, and finalize the slide presentation. Cloud collaboration platform 110 may include interface elements 112, access controls 114, search module 116, input receiver 118, and data 120.

Cloud collaboration platform 110 may provide an interface for designing the presentation slides, including appropriate tools and related functionalities. Such an interface may be referred to herein as an edit mode. Users 102 may access the edit mode to add new slides, add images, text, video, and sound, set background colors, etc. A subset of users 102 may be given access to the slide presentation via the edit mode.

Cloud collaboration platform 110 may provide a second, streamlined interface for reviewing, commenting on, and responding to presentation slides authored by other users. This streamlined interface may be referred to as a reader mode. The reader mode may include comments from readers while hiding comments from authors, i.e., comments made in the edit mode. In this fashion, a user employing the reader mode may avoid viewing comments that occurred during the initial authoring of the presentation slides. The reader mode may include an edit button to allow a user with edit access to transition out of reader mode and into edit mode. The reader mode may include buttons or other navigational controls to progress through slides, switch to a full screen mode, download a pdf of the slides, print the presentation, and perform other relevant functions. In an embodiment, users 102 may be able to add comments, respond to feedback stickers, etc. to the presentation slides in the reader mode view without seeing comments and suggestions from other users.

Interface elements 112 may provide components that allow cloud collaboration platform 110 to render a user interface for view by users 102 on devices 104. Interface elements 112 may include a JavaScript library or other user interface library to facilitate dynamic interactions between users 102 and cloud collaboration platform 110. Interface elements 112 may include a development toolkit facilitating the building and deployment of HTML5 applications or mobile applications. Interface elements 112 may include appropriate stylesheets and design formats to shape, for example, the display format of data retrieved by cloud collaboration platform 110.

Access controls 114 may control permissions and access to and/or within cloud collaboration platform 110. Access controls 114 may authorize connections to cloud collaboration platform 110 and/or documents therein using username/password combinations. In some embodiments, access controls 114 may employ an alternate authentication methodology, such as two-factor authentication, token authentication, biometric data, etc., to identify, authorize, encrypt, and account for user connections. The level of access granted to a user may vary depending on the user type; therefore, the functionality provided to users may differ depending on the user accessing the system. Access controls 114 may additionally track access to files among users 102. For example, access controls 114 may store information indicating that a particular user may access a particular document and an access level.

Search module 116 may allow users 102 to search for other users, documents, files, or materials within cloud collaboration platform 110. Search module 116 may employ a suitable search tool or indicator to receive an input from users 102. Search module 116 may use an appropriate cataloging methodology to store previous messages, comments, edits, etc. and retrieve appropriate information via full-text searches. Search module 116 may support mentions, i.e., the use of "@" or "#", to retrieve appropriate documents or users that satisfy the searches from users 102.

Input receiver 118 may receive and process inputs from users 102 within cloud collaboration platform 110. Input receiver 118 may receive inputs from any suitable mechanism including: a mouse, a keyboard, stylus, input gesture, or other suitable mechanism for expressing a user intentions. User inputs may include entering text, drawing checkmarks, circles, squares, lines, and other geographic symbols, swiping, clicking, tapping, dragging, and other gestures. Input receiver may use interface elements 112 to display appropriate navigational buttons, input forms, and other HTML fields to facilitate interaction with cloud collaboration platform 110.

Data 120 may be a storage of information relevant to the documents, messages, comments, and other information in cloud collaboration platform 110. Data 120 may be housed or stored in a relational database, a NoSQL database or other horizontally scaling database, a digital ledger technology or blockchain, or any other suitable storage mechanism. For instance, cloud collaboration platform 110 may harness any commercially available database management system to store and retrieve data 120. In an embodiment, data 120 may be stored in a centralized storage area network (SAN), network-attached storage (NAS), redundant array of independent disks, and/or any other configuration of storage devices to supply sufficient storage capacity to store database tables and supporting structures. Sufficient storage may alternatively exist in any other physically attached magnetic storage, cloud storage, or additional storage medium. In an embodiment, cloud collaboration platform 110 deploys a hard-disk interface, such as ATA, SATA, SCSI, SAS, and/or fibre for interfacing with storage mediums housing data 120.

Figure 2:
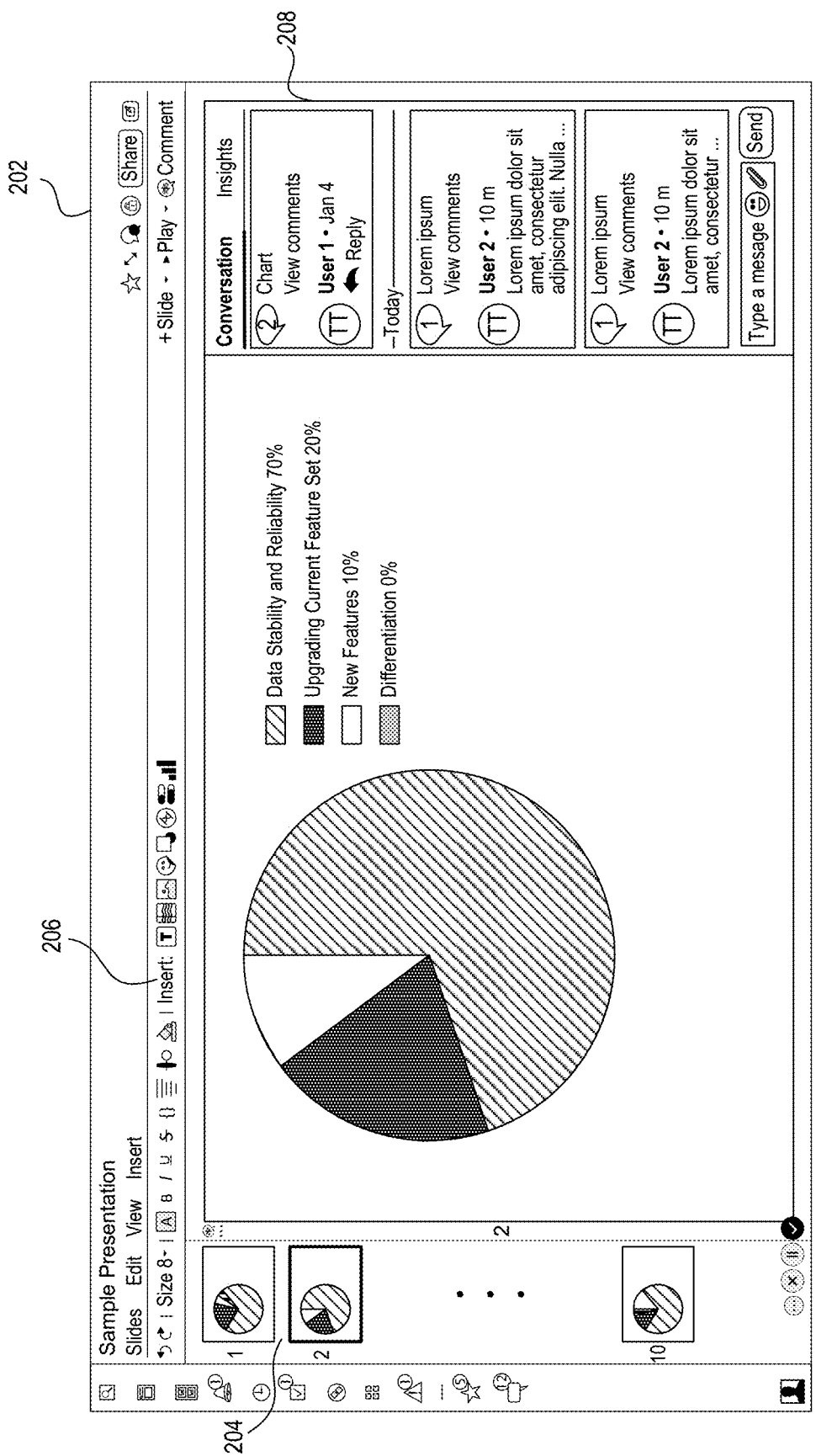
FIG. 2 is an example screen display of a cloud collaboration platform for developing presentation slides in edit mode, according to some embodiments.

FIG. 2 is an example of a screen display 200 in a cloud collaboration platform for developing presentation slides in an edit mode, according to some embodiments. The screen display provided in FIG. 2 is merely exemplary, and one skilled in the relevant art(s) will appreciate that many approaches may be taken to provide a suitable screen display 200 in accordance with this disclosure. Screen display 200 may include editor screen 202, slides 204, slide-building tools 206, and commenting facilities 208.

Editor screen 202 may display a slide presentation for users 102. Editor screen 202 may include tools to add slides, rearrange slides, and control the overall flow of the slide presentation. Editor screen 202 may provide tools to add text, images, audio/video components to a particular slide and position the elements appropriately. Editor screen 202 may allow users to select colors, change fonts, etc. Editor screen 202 may allow users 102 to scroll to other slides in a single view as opposed to displaying only one slide at a time.

Slides 204 may display a graphical representation of the slides comprising the slide presentation. Slides 204 may be thumbnails, i.e., a smaller resolution image, of the visual components contained in the slides. In an alternate embodiment, slides 204 may be textual, numerical, or another suitable representation of the slides in the presentation. In an embodiment, users 102 may click or otherwise input upon a particular slide in slides 204 to navigate the edit mode to view that particular slide.

Slide-building tools 206 may include components that allow users 102 to edit the slides in the edit mode. Slide-building tools 206 may include items that allow a user to add text, images, audio/video components, etc. Slide-building tools 206 may allow users to select colors, change fonts, etc. Slide-building tools 206 may allow users 102 to change font characteristics, adjust paragraph settings, etc.

Commenting facilities 208 may allow users 102 to view comments that they entered in cloud collaboration platform 110, replies to these comments, and comments from other users 102 within screen display 200. In an embodiment, users 102 may edit or delete comments in commenting facilities 208. In an embodiment, commenting facilities 208 may display comments in chronological order. However, other suitable organizational approaches may apply. Commenting facilities 208 may filter the comments displayed therein in additional fashions. In some embodiments, commenting facilities 208 may allow users to "like" comments from other users, attach files, @mention users, and perform other suitable communicative activities.

Figure 3:
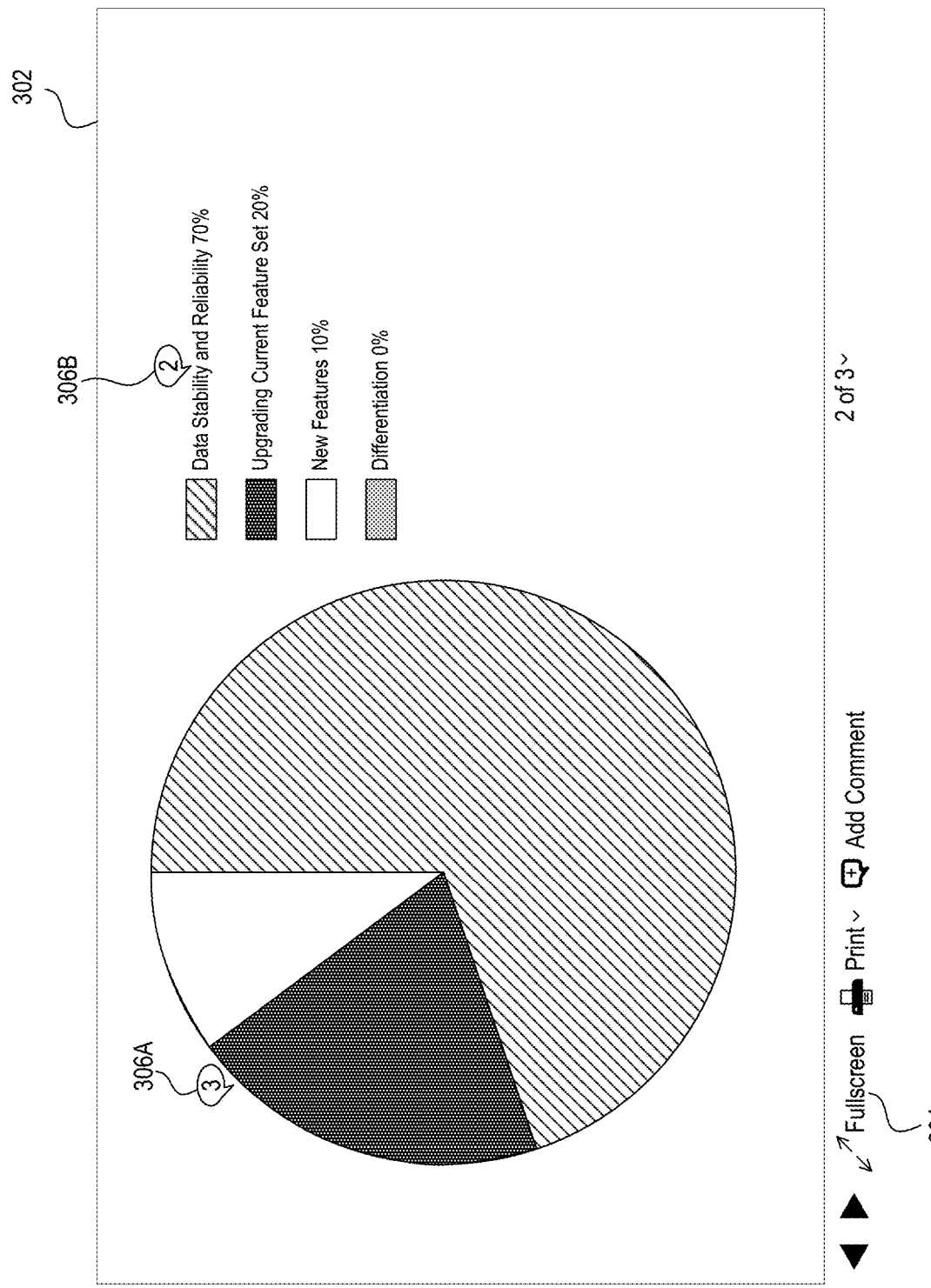
FIG. 3 is an example screen display of a cloud collaboration platform for presentation slides in reader mode, according to some embodiments.

FIG. 3 is an example of a screen display 300 in a cloud collaboration platform for presentation slides in reader mode, according to some embodiments. The screen display provided in FIG. 3 is merely exemplary, and one skilled in the relevant art(s) will appreciate that many approaches may be taken to provide a suitable screen display 300 in accordance with this disclosure. Screen display 300 may include viewport 302, navigation controls 304, and comments 306.

Viewport 302 may include slide layers, sections, and comments for review. Viewport 302 may present the slide presentation as the presentation may be received by an audience, i.e., without any designing tools, metadata, or other clutter. For example, users 102 viewing a slide presentation in reader mode may see only the slide components (e.g., text, images, multi-media files, the title) and comments from other readers (as opposed to authors or creators) in viewport 302. In an alternate embodiment, viewport 302 may only include comments from the reviewing user. In this manner, viewport 302 displays the slide presentation in a way that does not obscure any slide content, but still allows the reviewing user to provide feedback and comments. When a user enters a reader comment, editors in edit mode may see the reader comment alongside the editor comments.

Navigation controls 304 may receive inputs from users 102 and visual elements to provide visual cues to users 102 and to support the reception of the inputs. Navigation controls 304 may include a print button that allows users to print the contents of the slide or the presentation. Navigation controls 304 may include a comment button that allows a user to add a comment. In an embodiment, viewport 302 may be switched to a full screen mode that displays only the slide content while obscuring or hiding any navigation buttons and/or comments using navigation controls 304.

Comments 306, such as comments 306A and 306B, may be comments received from users 102 while users 102 are viewing the reader mode. Comments 306 may be associated through a suitable means with a visual element or section within the slide being viewed. Comments 306 may display in viewport 302 on top, near to, pointing to, etc. the section that the comment is associated with. In an embodiment, comments 306 may display a number that indicates a number of comments associated with the section or element, i.e., the number of comments exchanged or posted to the specific comment in question. In the example provided in FIG. 3, comment 306A displays a "3" indicating that three comments were made about the pie chart and comment 306B displays a "2" indicating that two comments were made about the "Data Stability and Reliability" element. As a user may comment multiple times about an element, the number may display all of the users comments about the element. However, other users may post replies to the comment or comment on the same element, and these comments may also be included in the displayed number. In an embodiment, comments from the edit mode may not display in the reader mode to further a more organic viewing experience for users 102 viewing the reader mode.

Comments 306 may incorporate additional comments added by users 102. In one embodiment, users 102 may use navigation controls 304 to select an option to add a comment. In screen display 300, users 102 may click or otherwise input upon "Add Comment." Users 102 may then drag, move, slide, etc. a comments icon, such as displayed in comment 306A to 306B to a particular element on the screen display. An element in this context may be an image, a block of text, etc. Users 102 may also be able to add comments that are associated with the entire slide. When users 102 select a location for the comment, the users may then enter text into the comment field through a suitable comment entering mechanism. One such example is described with reference to FIG. 2 as commenting facilities 208. When users 102 enter the new comment, users 102 may leverage a panoply of features provided by search module 116, e.g., @mentions, linking of documents, and references to other materials in the cloud collaboration platform 110. When the new comment is added, cloud collaboration platform 110 may store the comment in association with the particular element that users 102 indicated the comment should be associated with.

Moreover, comments 306 received in the reader mode may be segregated from comments 306 received in the edit mode. Thus, users 102 with access to the reader mode only may only view comments added from other users in the reader mode. Users 102 with access to the edit mode may view comments received from the reader mode and the edit mode. In some embodiments, access to the reader mode and/or edit mode comments may be set by permissions. In some embodiments, filtering mechanisms may be provided to allow users 102 to filter the comments that they may view to edit-mode comments and reader-mode comments.

Figure 4A:
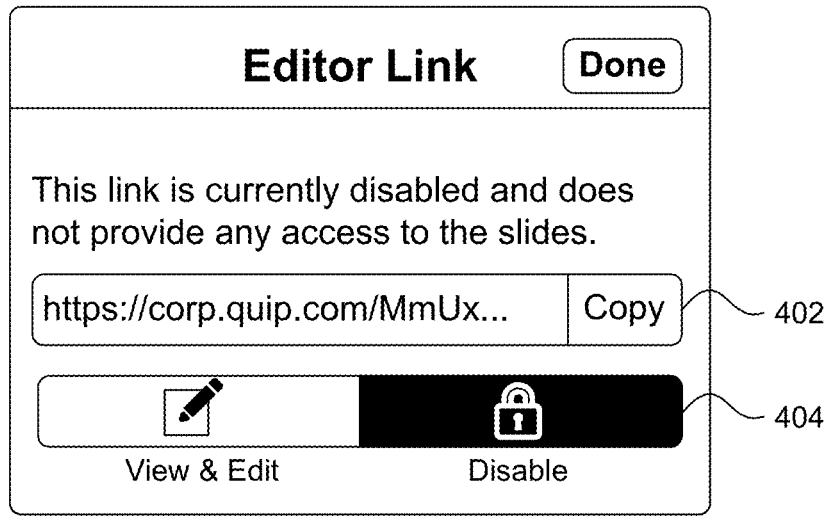
FIGS. 4A-4B are example screen displays of shareable user links, according to some embodiments.

FIG. 4A is an example of a screen display 400A in a cloud collaboration platform including a shareable link, according to some embodiments. The screen display provided in FIG. 4A is merely exemplary, and one skilled in the relevant art(s) will appreciate that many approaches may be taken to provide a suitable screen display 400 in accordance with this disclosure. Screen display 400A may include shareable link 402 and options 404.

Figure 4B:
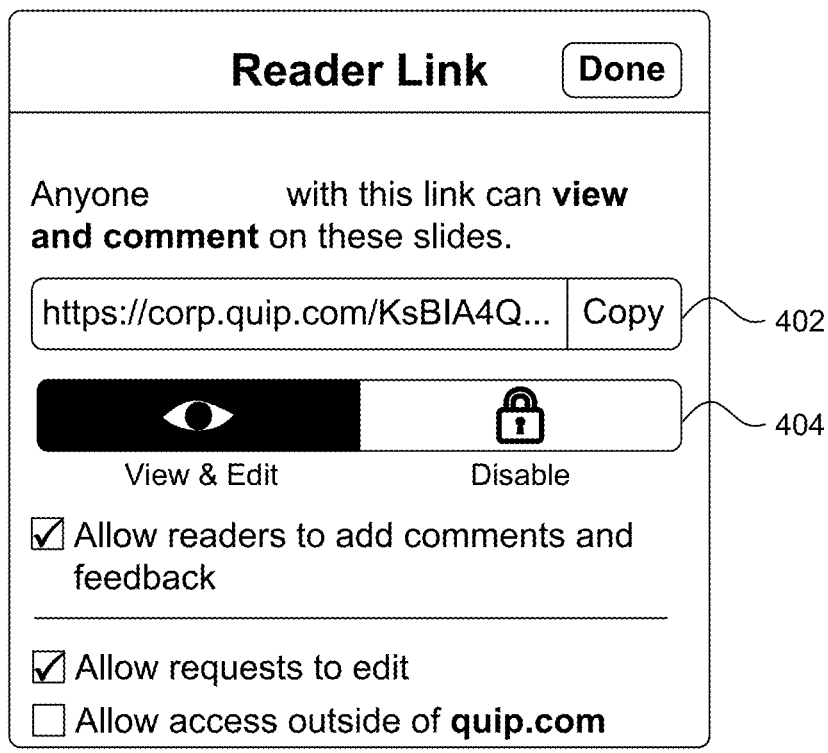

FIG. 4B is an example of a screen display 400A in a cloud collaboration platform including a shareable link, according to some embodiments. The screen display provided in FIG. 4B is merely exemplary, and one skilled in the relevant art(s) will appreciate that many approaches may be taken to provide a suitable screen display 400 in accordance with this disclosure. Screen display 400B may also include shareable link 402 and options 404.

Shareable link 402 may provide a link via which users 102 may distribute a reader mode of a slide presentation. Such a reader link may be a shareable link to the slide presentation, e.g., using HTTP, HTTPS, or other suitable protocol. Upon opening the link, a user may see only reader comments and the elements of the presentation, as described above with reference to FIG. 3. Comments made during the authoring of the presentation may be hidden from the user. Shareable link 402 may be created by engaging with reader mode or edit mode in a suitable fashion, for example, engaging input receiver 118 via navigation controls 304 or other input receiver in editor screen 202.

Options 404 may be selectable details, parameters, and configurations for shareable link 402. In the exemplary embodiment displayed in FIG. 4, a user may select "Show comments and allow new ones," "Reader Link," "Disable," and "View & Edit." The "Reader Link" may allow a user to enter a reader-link selection or an edit-link selection. A reader-link selection may cause a subsequent link that is created to be a link to the reader mode whereas an edit-link selection may cause a subsequent link that is created to be a link to the edit mode. A link created with "Allow readers to add comments and feedback" may display all comments, regardless of whether the comment was received in edit mode or reader mode. "View & Edit" may allow a user receiving the link to access the edit mode. These are illustrative examples and are in no way exhaustive.

Figure 5:
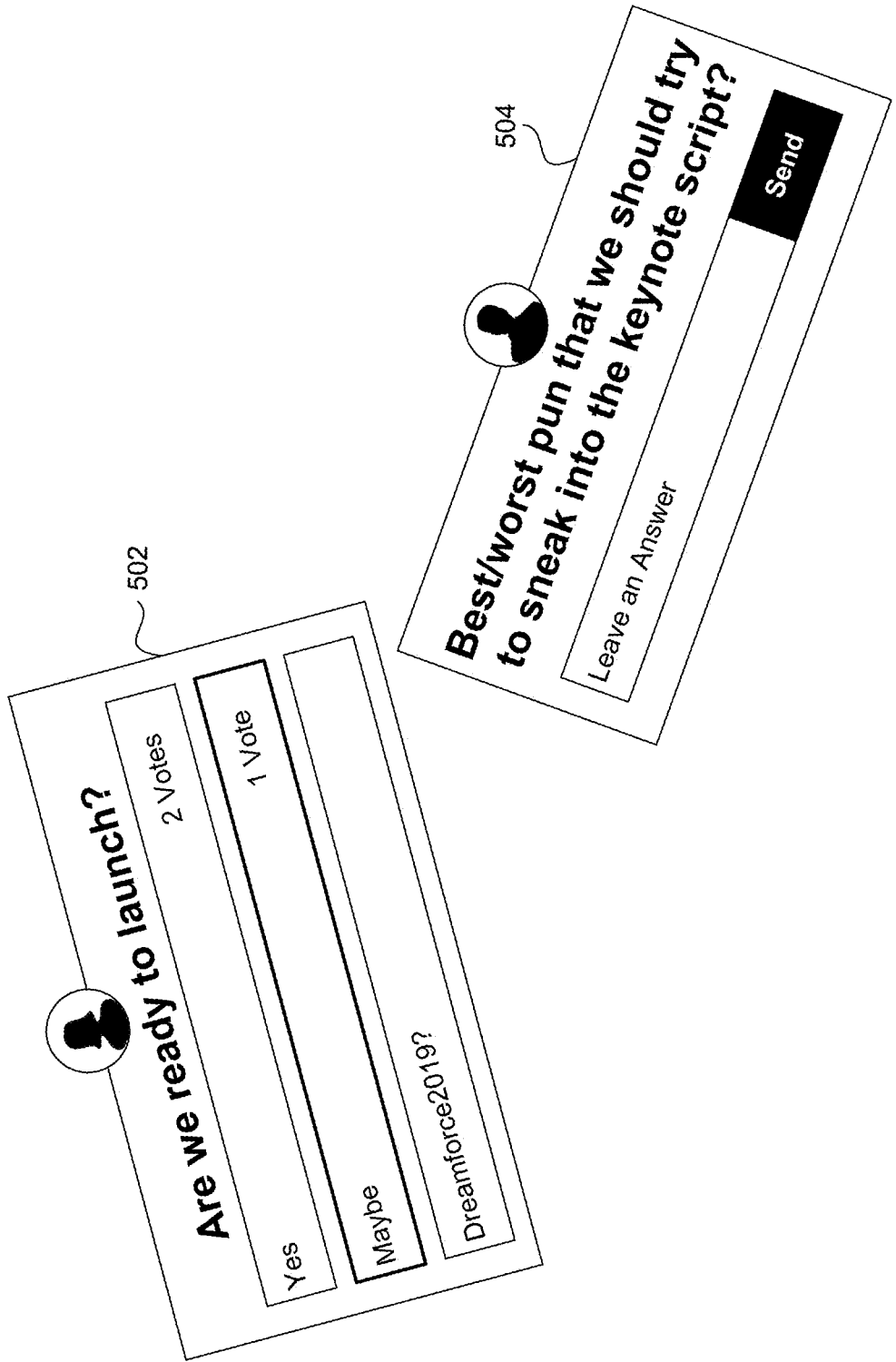
FIG. 5 is an example screen display of exemplary user prompts, according to some embodiments.

FIG. 5 is an example of a screen display 500 of exemplary user prompts, i.e., feedback stickers, according to some embodiments. The screen display provided in FIG. 5 is merely exemplary, and one skilled in the relevant art(s) will appreciate that many approaches may be taken to provide a suitable screen display 500 in accordance with this disclosure. Screen display 500 may include poll 502 and question 504. Users 102 in cloud collaboration platform 110 may include stickers and prompts within slides and comments. In an embodiment, a sticker or prompt may be a mechanism via which users can solicit and receive information from other users. For example, a user may conduct polls, receive text answers to questions, and garner other types of feedback.

Poll 502 may be an example of one fashion of garnering user feedback within a slide, message, or comment. Poll 502 may include a question or statement and a set of selections. When posted, poll 502 may record the votes or inputs from users 102 and display the collected feedback in poll 502. In cloud collaboration platform 110, poll 502 may be imbedded in a slide or presentation. In some embodiments, poll 502 may also be embedded in a message, comment, or in other suitable locations.

Question 504 may be a second example of an approach to receiving user feedback. Question 504 may include a question or statement and an input field. When posted, question 504 may record inputs from users 102 and provide the responses in an appropriate fashion to the user that created the question. Question 504 may be imbedded in a slide or presentation. In some embodiments, question 504 may also be embedded in a message, comment, or in other suitable locations.

Figure 6:
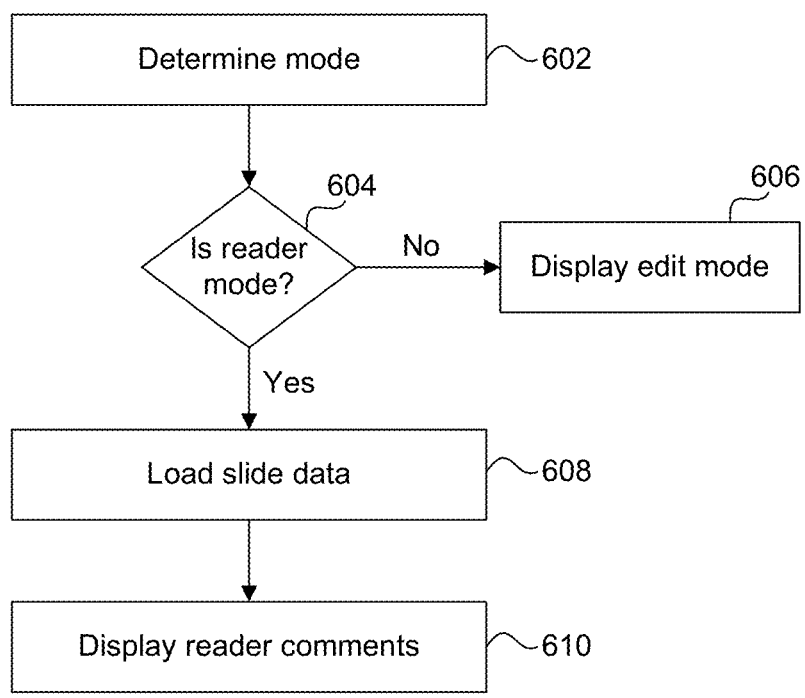
FIG. 6 is a flowchart illustrating a method of displaying a reader mode in a cloud collaboration platform, according to some embodiments.

FIG. 6 illustrates a method 600 of displaying a reader mode in a cloud collaboration platform, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art(s).

In 602, cloud collaboration platform 110 may determine the mode to enter when initializing or commencing a slide presentation. Cloud collaboration platform 110 may employ interface elements 112 to render a user interface by which to receive an indication to enter reader mode or edit mode. Cloud collaboration platform 110 may receive a request to enter reader mode via a reader link or edit link.

In 604, cloud collaboration platform 110 may determine if a reader mode is being initialized. If yes, then method 600 may proceed to 608. If no, then method 600 may proceed to 610.

In 606, cloud collaboration platform 110 may display an edit mode of a slide presentation. An edit mode may include the full range of editor capabilities provided the user is the author or otherwise has permission to edit the document. The edit mode may include all comments from all users or a subset thereof. Cloud collaboration platform may employ access controls 114 to ensure that the user initializing the edit mode possesses appropriate credentials to enter the edit mode. The edit mode is described in further detail above with reference to FIG. 2.

In 608, cloud collaboration platform 110 may load data needed to render the reader mode of the slide presentation from data 120 or another suitable location. Cloud collaboration platform 110 may load images, text, multi-media files, formatting information, colors, and other information needed to render the slides in the presentation. Cloud collaboration platform 110 may also pull from data 120 all comments, messages, or feedback stickers/surveys, or an appropriate subset thereof.

In 610, cloud collaboration platform 110 may render the reader view and display reader-mode comments. In one embodiment, reader-mode comments are comments entered by users 102 while in reader mode. In another embodiment, cloud collaboration platform 110 may only display comments entered by the viewing user and responses to those comments. In one embodiment, cloud collaboration platform 110 may not load edit-mode comments or other information that is outside the scope of the reader view. In another embodiment, cloud collaboration platform 110 may expressly hide editor comments, tracked changes, notes, or other users' comments. An exemplary version of such a reader mode is described further above with reference to FIG. 3.

Figure 7:
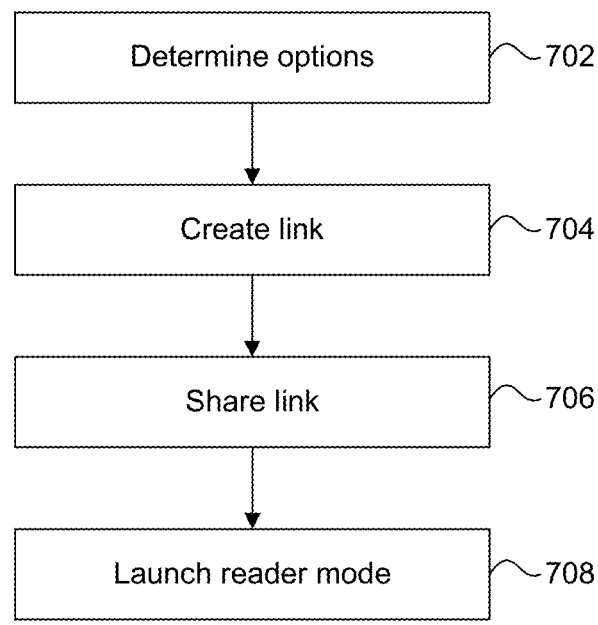
FIG. 7 is a flowchart illustrating a method of creating a reader link in a cloud collaboration platform, according to some embodiments.

FIG. 7 illustrates a method 700 of creating a link to a reader mode in a cloud collaboration platform, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art(s).

In 702, cloud collaboration platform 110 may determine options selected by the creating user. Such options may include permissions to the reader mode such as advanced edit access, tiered-user access, etc. Cloud collaboration platform 110 may also receive information about a user or subset of users, i.e., a targeted reader link. These options are described as options 404 with reference to FIGS. 4A-4B.

In 704, cloud collaboration platform 110 may create a link. Cloud collaboration platform 110 may use any suitable linking mechanism or protocol, for example HTTP or HTTPS. Cloud collaboration platform 110 may store or catalog the information about the created link in data 120.

In 706, cloud collaboration platform 110 may share the link with an appropriate user or subset of users. In an embodiment, cloud collaboration platform 110 may transmit the link to the user through an internal messaging system. Cloud collaboration platform 110 may also transmit the link through an email or other external messaging system. Cloud collaboration platform 110 may allow the creating user to copy the link to their local clipboard or cache so that they can share the link with an appropriate user or users.

In 708, cloud collaboration platform 110 receives an incoming transmission, i.e., web-based hit to the link. Cloud collaboration platform 110 may employ access controls 114 to ensure that the initializing user has access permission to the reader mode. Cloud collaboration platform 110 may render then appropriate reader mode for the initializing user, a process described in further detail above with reference to FIG. 6. The reader mode may include a streamlined set of components from the slide presentation as well as facilities to allow the reader-mode viewing user to add reader comments. Editor comments, i.e., comments added by users during the editing process, may be hidden from users 102 viewing the reader mode.

Figure 8:
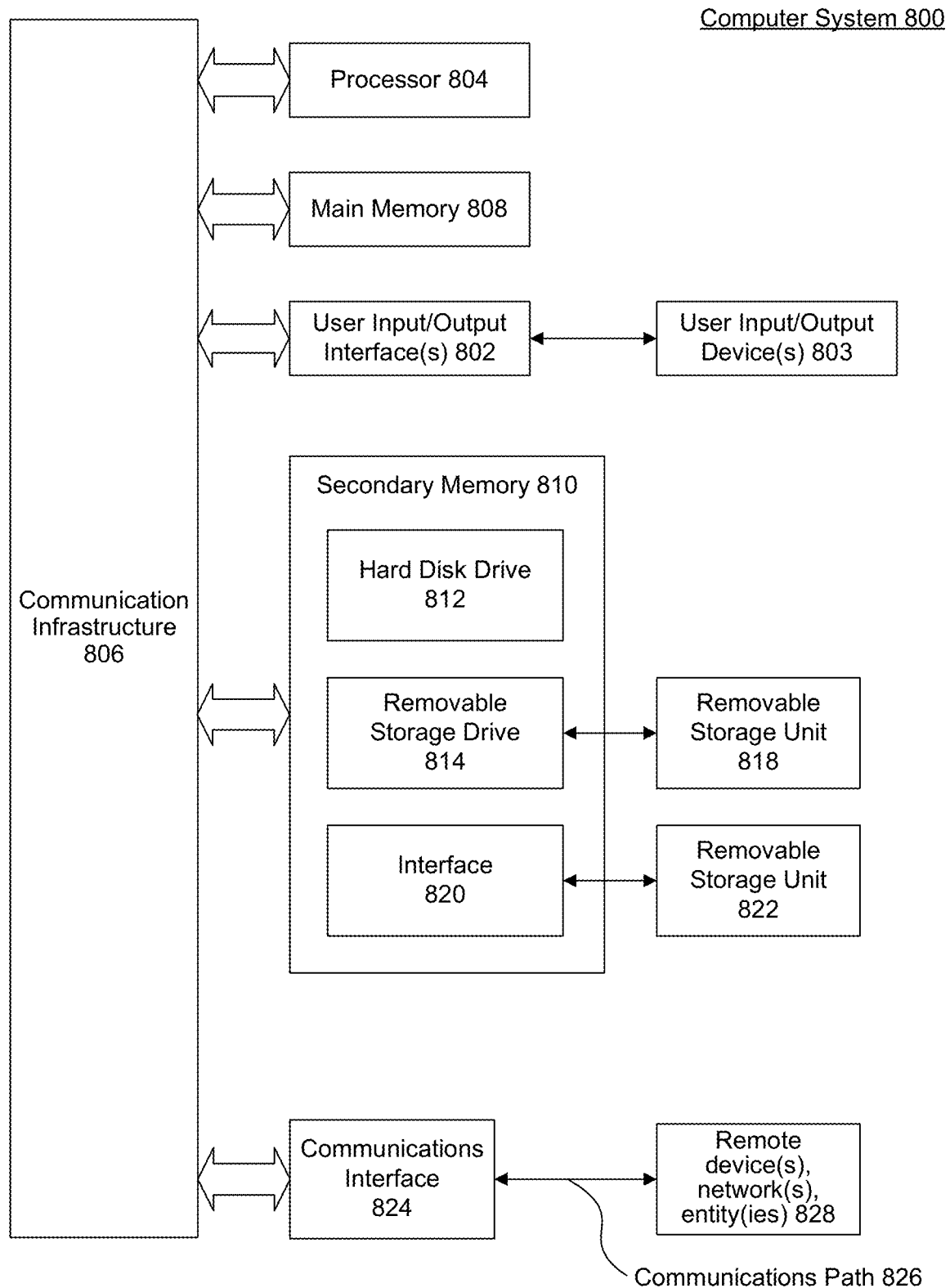
FIG. 8 is an example computer system useful for implementing various embodiments.

Various embodiments may be implemented, for example, using one or more well-known computer systems, such as computer system 800 shown in FIG. 8. One or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 808, such as monitors, keyboards, pointing devices, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
displaying, by a cloud collaboration platform, a slide presentation in a reader mode, wherein the reader mode is configured to display visual elements in the slide presentation and navigation controls;
receiving, by the cloud collaboration platform, a comment in the reader mode via the navigation controls;
associating, by the cloud collaboration platform, the comment with a particular element in the visual elements;
displaying, by the cloud collaboration platform, the comment in the reader mode in association with the particular element;
providing, by the cloud collaboration platform, a link creation interface;
receiving, by the cloud collaboration platform, a reader-link-creation selection via the link creation interface;
in response to the reader-link-creation selection, creating, by the cloud collaboration platform, a reader link to the reader mode; and
initializing, by the cloud collaboration platform, the reader mode upon reception of an engagement with the reader link, wherein the displaying, receiving, and associating are performed by one or more computers.

2. The method of claim 1, further comprising:
displaying, by the cloud collaboration platform, the slide presentation in an edit mode, wherein the edit mode is configured to display the visual elements in the slide presentation, slide-building tools, and the comment;
receiving, by the cloud collaboration platform, a second comment in the edit mode;
associating, by the cloud collaboration platform, the second comment with a second element in the visual elements; and displaying, by the cloud collaboration platform, the second comment in the edit mode in association with the second element.

3. The method of claim 1, further comprising:
receiving, by the cloud collaboration platform, an edit-link-creation selection via the link creation interface;
in response to the edit-link-creation selection, creating, by the cloud collaboration platform, an edit link to an edit mode; and
initializing, by the cloud collaboration platform, the edit mode upon reception of an engagement on the edit link.

4. The method of claim 1, further comprising:
receiving, by the cloud collaboration platform, a mention in the comment, wherein the mention references an account in the cloud collaboration platform;
determining, by the cloud collaboration platform, a contact for the account; and
notifying, by the cloud collaboration platform, the account via the contact of the comment.

5. The method of claim 1, further comprising:
receiving, by the cloud collaboration platform, the comment on a feedback sticker comprising a user-generated poll in the slide presentation;
storing, by the cloud collaboration platform, the comment in association with the feedback sticker; and
displaying, by the cloud collaboration platform, the comment on the feedback sticker.

6. The method of claim 1, further comprising:
receiving, by the cloud collaboration platform, an input in the reader mode via the navigation controls; and
moving, by the cloud collaboration platform, to a next slide in the slide presentation based on the input.

7. The method of claim 1, wherein the edit mode displays one or more comments added in the reader mode and one or more comments added in the edit mode.

8. A system, comprising:
a memory; and
at least one processor coupled to the memory and configured to:
display a slide presentation in a reader mode in a cloud collaboration platform, wherein the reader mode is configured to display visual elements in the slide presentation and navigation controls;
receive a comment in the reader mode via the navigation controls;
associate the comment with a particular element in the visual elements;
display the comment in the reader mode in association with the particular element;
provide a link creation interface;
receive a reader-link-creation selection via the link creation interface;
in response to the reader-link-creation selection, create a reader link to the reader mode; and
initialize the reader mode upon reception of an engagement with the reader link.

9. The system of claim 8, the at least one processor configured to:
display the slide presentation in an edit mode, wherein the edit mode is configured to display the visual elements in the slide presentation, slide-building tools, and the comment;
receive a second comment in the edit mode; and
associate the second comment with a second element in the visual elements; and
display the second comment in the edit mode in association with the second element.

10. The system of claim 8, the at least one processor configured to:
receive an edit-link-creation selection via the link creation interface;
in response to the edit-link-creation selection, create an edit link to an edit mode; and
initialize the edit mode upon reception of an engagement on the edit link.

11. The system of claim 8, the at least one processor configured to:
receive a mention in the comment, wherein the mention references an account in the cloud collaboration platform;
determine a contact for the account; and
notify the account via the contact of the comment.

12. The system of claim 8, the at least one processor configured to:
receive the comment on a feedback sticker comprising a user-generated poll in the slide presentation;
store the comment in association with the feedback sticker; and
display the comment on the feedback sticker.

13. The system of claim 8, the at least one processor configured to:
receive an input in the reader mode via the navigation controls; and
move to a next slide in the slide presentation based on the input.

14. The system of claim 8, wherein the edit mode displays one or more comments added in the reader mode and one or more comments added in the edit mode.

15. A non-transitory computer-readable device having instructions stored thereon that, when executed by at least one computing device, causes the at least one computing device to perform operations comprising:
displaying a slide presentation in a reader mode in a cloud collaboration platform, wherein the reader mode is configured to display visual elements in the slide presentation and navigation controls;
receiving a comment in the reader mode via the navigation controls;
associating the comment with a particular element in the visual elements;
displaying the comment in the reader mode in association with the particular element;
providing a link creation interface;
receiving a reader-link-creation selection via the link creation interface;
in response to the reader-link-creation selection, creating a reader link to the reader mode; and
initializing the reader mode upon reception of an engagement with the reader link.

16. The non-transitory computer-readable device of claim 15, the operations further comprising:
displaying the slide presentation in an edit mode, wherein the edit mode is configured to display the visual elements in the slide presentation, slide-building tools, and the comment;
receiving a second comment in the edit mode;
associating the second comment with a second element in the visual elements; and
displaying the second comment in the edit mode in association with the second element.

17. The non-transitory computer-readable device of claim 15, the operations further comprising:
receiving an edit-link-creation selection via the link creation interface;

in response to the edit-link-creation selection, creating an edit link to an edit mode; and initializing the edit mode upon reception of an engagement on the edit link.

18. The non-transitory computer-readable device of claim 15, the operations further comprising:

receiving a mention in the comment, wherein the mention references an account in the cloud collaboration platform;

determining a contact for the account; and notifying the account via the contact of the comment.

19. The non-transitory computer-readable device of claim 15, the operations further comprising:

receiving the comment on a feedback sticker comprising a user-generated poll in the slide presentation;

storing the comment in association with the feedback sticker; and displaying the comment on the feedback sticker.

20. The non-transitory computer-readable device of claim 15, wherein the edit mode displays one or more comments added in the reader mode and one or more comments added in the edit mode.

\* \* \* \* \*